United States Patent [19]

Saadeh et al.

[11] Patent Number: 5,402,431

[45] Date of Patent: Mar. 28, 1995

[54] INNATE BUS MONITORING SYSTEM FOR COMPUTER SYSTEM MANAGER

[75] Inventors: Said S. Saadeh, Plano; Scott C. Farrand, Tomball; Thomas J. Hernandez, Houston; Paul R. Fulton, Plano; Richard P. Mangold, Tomball; Richard A. Stupek, Houston; James E. Barron, Spring; Richard A. Kunz, Garland; Dinesh K. Sharma, Plano, all of Tex.

[73] Assignee: Compaq Computer Corporation, Houston, Tex.

[21] Appl. No.: 157,335

[22] Filed: Nov. 23, 1993

Related U.S. Application Data

[63] Continuation of Ser. No. 719,240, Jun. 24, 1991, abandoned.

[51] Int. Cl.$^6$ ............................................. G06F 13/00
[52] U.S. Cl. ............................. 371/67.1; 364/DIG. 1; 364/265; 364/266; 371/66; 395/575; 395/700
[58] Field of Search ................. 364/530, 253, DIG. 2, 364/265, 266; 395/650, 700, 575; 371/66, 67.1

[56] References Cited

U.S. PATENT DOCUMENTS

| | | | |
|---|---|---|---|
| 3,670,309 | 6/1972 | Amdahl et al. | |
| 4,257,095 | 3/1981 | Nadir | 395/325 |
| 4,495,568 | 1/1985 | Gilbert et al. | 364/200 |
| 4,686,526 | 8/1987 | Gritzo | 340/825.06 |
| 4,727,478 | 2/1988 | Endfield et al. | 395/275 |
| 4,739,310 | 4/1988 | Yamamoto | 340/365.5 |
| 4,780,821 | 10/1988 | Crossley | 395/650 |
| 4,916,441 | 4/1990 | Gombrich et al. | 340/712 |
| 5,018,060 | 5/1991 | Gelb et al. | 364/200 |
| 5,036,455 | 7/1991 | Atwood | 395/575 |
| 5,099,420 | 3/1992 | Barlow et al. | 395/325 |
| 5,163,151 | 11/1992 | Bronikowski et al. | 395/725 |
| 5,198,805 | 3/1993 | Whiteside et al. | 340/825.06 |
| 5,283,792 | 2/1994 | Davies, Jr. et al. | 371/66 |

FOREIGN PATENT DOCUMENTS

0077147 4/1983 European Pat. Off. .

OTHER PUBLICATIONS

Coffin, R. P., et al., *Enhanced Collection and Recording of Computer . . . Trace Data . . . ;* IBM Tech. Bulletin, 1985.

Haban, et al., "A Hybrid Monitor for Behavior and Performance Analysis of Distributed Systems", *IEEE Transactions on Software Engineering*, vol. 16, No. 2, pp. 197–211 (Feb., 1990).

Liu, et al., "Hardware Monitoring of a Multiprocessor System", *IEEE Micro*, vol. 9, No. 5, pp. 44–51 (Oct., 1989).

*Primary Examiner*—Kevin A. Kriess
*Assistant Examiner*—Jonathan Hall Backenstose
*Attorney, Agent, or Firm*—Konneker Bush Hitt & Chwang

[57] ABSTRACT

A system for innately monitoring a computer system. All address and data signals transferred over the system bus. Certain ones of the address signals are selected as related to the operating conditions of the computer system. A data filter selects data signals which correspond to the selected address signals and the selected address and data signals related to operating conditions of the computer system are then stored, either in a register if the selected address and data signals are composed of dynamic information requiring frequent status updates or in a first-in, first-out memory, when the selected address and data signals are composed of less dynamic information.

9 Claims, 7 Drawing Sheets

INNATE BUS MONITORING SYSTEM FOR COMPUTER SYSTEM MANAGER

This is a continuation of application Ser. No. 07/719,240, filed Jun. 24, 1991, now abandoned.

CROSS REFERENCE TO RELATED APPLICATIONS

This application is related to co-pending U.S. patent application Ser. Nos. 07/720,259, entitled COMPUTER SYSTEM MANAGER, 07/720,258, entitled IN BAND/OUT OF BAND ALERT DELIVERY SYSTEM FOR COMPUTER SYSTEM MANAGER, 07/719,243, entitled REMOTE CONSOLE EMULATOR FOR COMPUTER SYSTEM MANAGER, and 07/719,394, entitled POWER SUPPLY FOR COMPUTER SYSTEM MANAGER, all of which were filed on even date herewith, assigned to the assignee of the present invention and hereby incorporated by reference as if reproduced in their entirety.

BACKGROUND OF THE INVENTION

1. Field of the Invention

The invention relates to a innate monitoring system for a computer system manager, and, more particularly to a innate monitoring system for a system manager which monitors information transfer along a system bus of the computer system.

2. Description of Related Art

The desire to share computer resources has motivated the development and continuing improvement of computer networks. One such computer network is generally referred to as a local area network (or "LAN"). A LAN is a system of computer hardware and software that links components such as computers, printers and other peripherals into a network suitable for transmission between various ones of the linked components located in relative proximity to each other, for example in different offices in a building, or in different buildings situated near one another. Similar to a LAN is a wide area network (or "WAN"). A WAN differs from a LAN in that a telephone network is also required to link at least some of the components included in the network to the remainder of the network components.

Various types of network operating systems are in existence today. They include the NetWare system manufactured by Novell, Inc. of Provo, Utah, the VINES system manufactured by Banyan, and the LAN Manager system manufactured by Microsoft Corporation of Redmond, Wash. While such network operating systems often include a network manager, the network manager included in such systems have typically relies upon the network operating system to provide data to the network manager for performing network management functions. Since network managers have been forced to rely upon data transmitted by the network, prior network managers have focussed on analyzing the health of the network and have not been particularly well suited to analyze the health of the components of the network.

Thus, of the five functional areas of network management (configuration, fault analysis, accounting, performance and security) recognized by the OSI/Network Management Forum, network managers have been best equipped to performing configuration and security management. Network managers can also provide limited fault analysis, but, in most cases, only after failure has occurred. Recently, the development of larger networks, both LAN and WAN, which include multiple printer, communication, database, and file server locations have been contemplated. This drive towards combining increasing numbers of computer components into a single network, has led to an increased demand for greater management capabilities. While, in the past, failure alerts may have been satisfactory, there is an increasing demand for information that will lead to failure whereby potential failures may be reported in sufficient time to allow for corrective action before an actual failure occurs. In addition to this increased demand for information that will lead to failure, the capability of real-time analysis of the performance of a computer system is also seen as a highly desirable management capability, particularly in the development of larger, multiple file server networks which will challenge minicomputers and mainframes for larger scale applications. Furthermore, as many of such networks will utilize a WAN configuration, the need to be able to manage the network from a remote console is of increased importance. Total reliance on local management capabilities would be a significant detriment to such systems since at least one major component of the systems would likely be remotely located with respect to the remainder of the system, thereby producing a network unable to manage the entire system from a single management console.

SUMMARY OF THE INVENTION

In one embodiment, the present invention is of a system for innately monitoring a computer system which comprises means for detecting data and address signals transferred along the system bus and processing means connected to the detecting means. The processing means selects data and address signals related to events of interest for transfer to the computer processor. In one aspect of this embodiment of the invention, the processing means includes means for selecting address signals related to events of interest and means for selecting data signals related to the events of interest.

In another embodiment, the present invention is of a system for innately monitoring a computer system which comprises means for receiving all address and data signals transferred over the system bus, and means for selecting address signals related to operating conditions of the computer system. A data filter selects data signals which correspond to the selected address signals and the selected address and data signals related to operating conditions of the computer system are then stored. In one aspect of this embodiment, the storage means is comprised of a register file for storing dynamic information requiring frequent status updates and a first-in, first-out memory for storing less dynamic information.

BRIEF DESCRIPTION OF THE DRAWINGS

The invention may be better understood and its numerous objects, features and advantages become apparent to those skilled in the art by referencing the accompanying drawing in which.

DETAILED DESCRIPTION OF A PREFERRED EMBODIMENT

Figure 1:
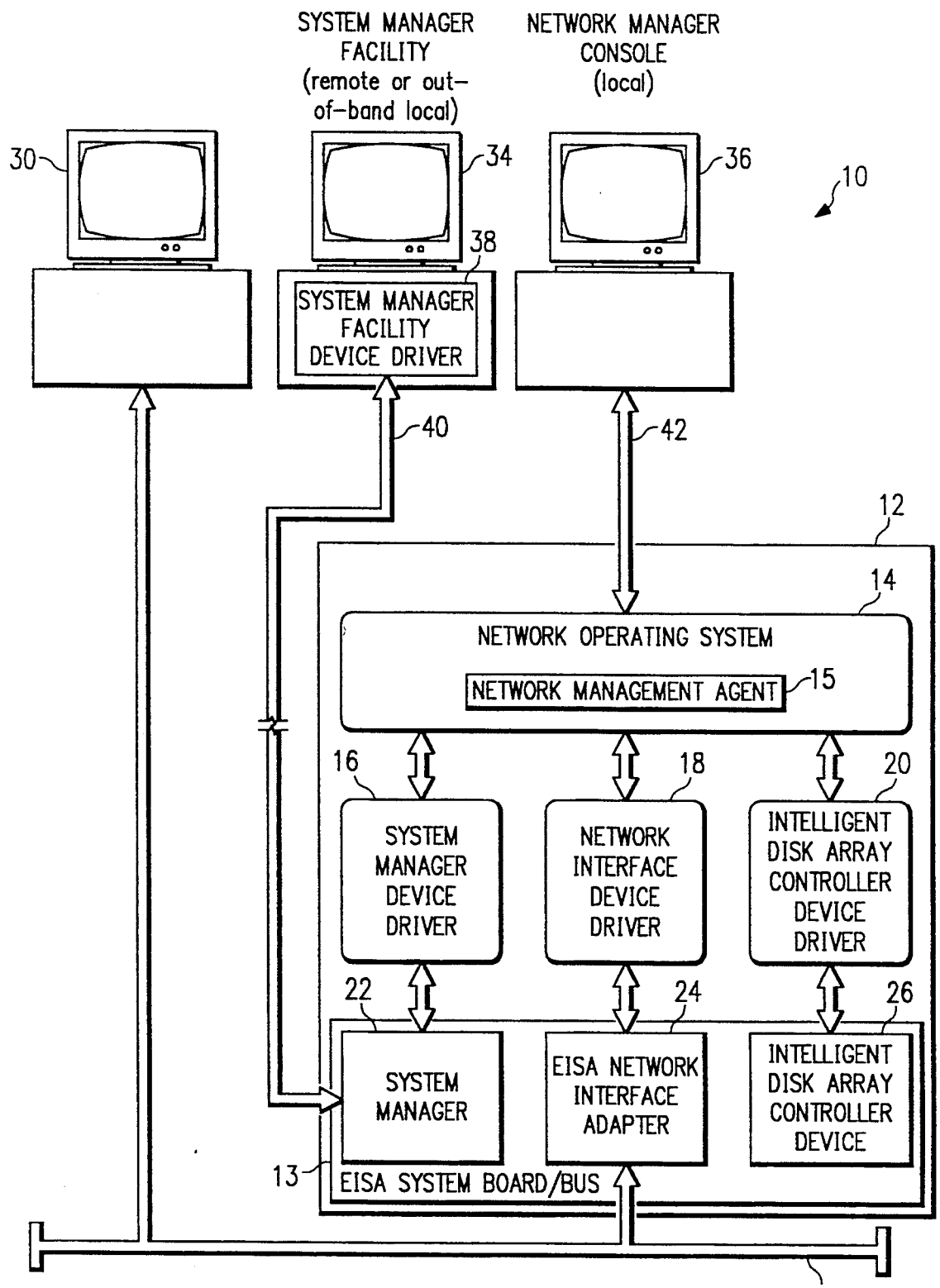
FIG. 1 is a block diagram of a computer network having an EISA based computer system and a computer system manager constructed in accordance with the teachings of the present invention installed therein.

Referring first to FIG. 1, an extended industry standard architecture (or "EISA") based computer network 10 having a system manager 22 constructed in accordance with the present invention shall now be described in detail. The computer network 10, which may be configured as either a LAN, WAN, or other type of network configuration, includes an EISA server 12, for example, a Systempro Model 486-840 manufactured by Compaq Computer Corp. of Houston, Tex., having an EISA based computer system board comprised of a series of computer subsystems (not shown) interconnected by a EISA based system bus. As the computer subsystems themselves are not specifically illustrated herein, the EISA computer system board and EISA system bus are, for ease of illustration, indicated as a unified element, EISA system board/bus 13, although all specific references to such element shall specifically indicate which portion of the unified element is being considered in such reference.

Installed on the EISA computer system board 13 are a plurality of cards which include the system manager 22, which, as will be more fully described below, is comprised of a 32 bit intelligent bus master board and supporting firmware, an EISA network interface adapter 24 and an intelligent disk array controller device 26. Installed in the operating system (or "OS") section of the EISA server 12 is a network operating system 14, preferably one which includes a network management agent 15. It is contemplated that any one of numerous network operating systems, for example, the NetWare or LAN Manager network operating systems previously described, would be suitable for use as the network operating system 14.

Interfacing the system manager 22 and the network operating system 14 is a system manager device driver 16. The system manager device driver 16 acts as a hi-directional translator for all requests to and from the system manager 22, thereby providing two-way communication between the system manager 22 and the network management agent 15. Through this interconnection between the system manager 22 and the network management agent 15, the network management agent 15 may supply information to or receive information collected by the system manager 22. Object management by the system manager 22 may, therefore, be initiated by the network management agent 15 if the network management agent 15 issues instructions to create, delete, modify, reset, or clear objects stored in the system manager 22.

The system manager device driver 16 will also handle certain in-band and out-of band alerts. If generated by the system manager 22, an in-band alert will be transmitted by the system manager device driver 16 to the network operating system 14 which, under the control of the network management agent 15, will direct the in-band alert to a local network manager console 36 connected to the network operating system 14 by in-band network bus 42. Out-of-band alerts generated by the network operating system 14, on the other hand, will be transmitted by the system manager device driver 16 to the system manager 22 for transmission to a remotely located system manager facility 34 connected to the system manager 22 via an asynchronous link 40, for example, a telephone connection. Two-way communication between the system manager 22 and the remotely located system manager console is provided by a system manager facility device driver 38. While there are additional signals transmitted between the system manager 22 and the network operating system 14 by the system manager device driver 16, these additional signals shall be discussed in greater detail later.

The network management agent 15 also operates as a central collection point for network management information for the EISA server 12 by acting as a link between the system manager 22, other cards installed on the computer system board 13, and the computer network itself. For example, in the embodiment of the invention illustrated in FIG. 1, an EISA network interface adapter 24, for example, a Model NE3200 32-bit Ethernet adapter manufactured by Anthem Electronics, Inc., and an intelligent disk array controller device 26, are also installed on the computer system board 13. The network operating system 14 connects the computer system board 13 and, via a network interface device driver 18 which operates in a manner similar to the system manager device driver 16, the network interface adapter 24 for two-way data transmission therebetween. Furthermore, as the network interface adapter 24 is connected for two-way data transmission with the network 28, a two-way communication link between the system manager 22 and the network 28 is thusly provided. The network 28 is the interface of the network components via the network media. The network 28 may be configured in a token ring, ethernet, or other network topology in use today, to control the access of multiple computer stations to the network 28, although, in the embodiment of the invention described and illustrated herein, a single computer station 30 has been provided.

An intelligent disk array controller device driver 20 which, like the network interface device driver 18, operates in a manner similar to the system manager device driver 16, provides for two-way data transmission between the system manager 22 and, via the network operating system, the intelligent disk array controller device 26. The intelligent disk array controller device 26 provides disk storage for the computer system board 13. For example, it is contemplated that the intelligent disk array (or "IDA") controller device 26 may provide 840 Mbytes of disk storage for the computer system board 13 by associating four 210M-byte Compaq IDA drive pairs therewith.

Figure 2:
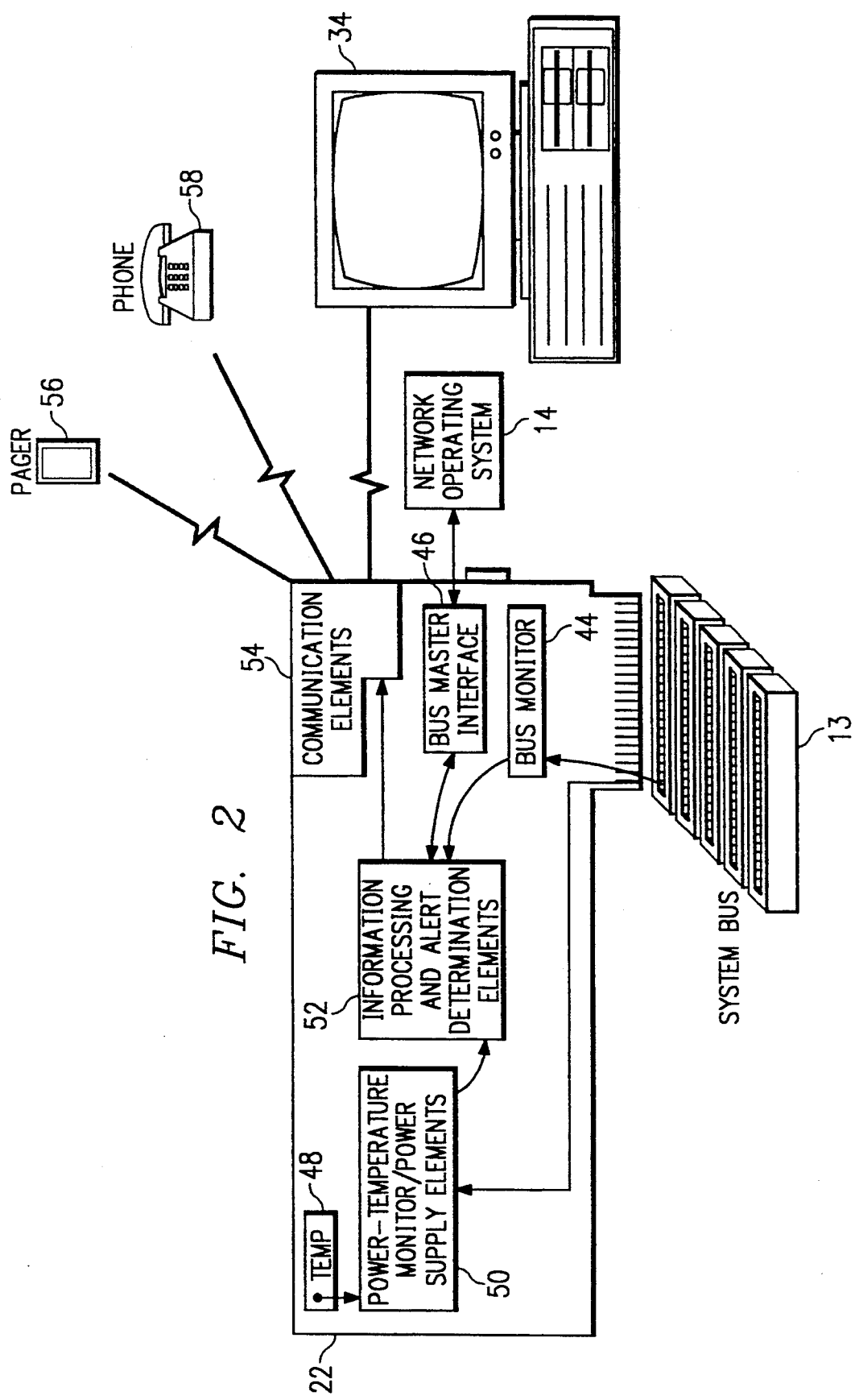
FIG. 2 is a block diagram of the system manager of FIG. 1 which illustrates information flow to and from, as well as within, the system manager.

Referring next to FIG. 2, the flow of information, most commonly in the form of data and alerts, to and from, as well as within the system manager 22 shall now be described in greater detail. As will be more fully described below, the system manager 22 has the ability to monitor various system components and parameters. If a component experiences a failure or exhibits characteristics that indicate it may experience a failure, the system manager 22 detects the failure or characteristic indicative of a potential failure and reports the failure or characteristic indicative of a potential failure as an alert in a manner such that corrective action can be taken.

As may be seen in FIG. 2, the path by which data accumulated during the monitoring of system components and parameters indicative of an actual or potential failure may be any one of four paths, depending on the particular type of actual or potential failure being monitored. Each system component being monitored may be referred to as an object having a number of attributes. As the components continue to be monitored, the value of the object's attributes may change, for example, by incrementing, decrementing, updating, resetting or modifying. When the attributes exceed their boundary or threshold value, an alert will be generated. In addition to alerts, the attributes of objects may be utilized to provide continuous real-time monitoring of the computer system board 13 without interfering with normal system operations.

Addressing the specific signals being monitored by the system bus manager 22, the computer system bus 13 supplies certain signals to a bus monitor 44 which will help determine the state of the computer system board 13. These signals include interrupt request (or "IRQ") signals, data memory request (or "DRQ") signals and input/output (or "I/O") signals. In one embodiment of the invention, it is contemplated that the bus monitor 44 monitors the I/O signals although, in a further embodiment of the invention, it is contemplated that the bus monitor 44 monitors the supplied IRQ, DRQ and I/O signals. If the signals are active, then the corresponding system resources are being used. In this manner, these signals may be used to monitor the performance of the computer system board 13. Other signals supplied by the computer system bus 13, are utilized during object management to indicate alert conditions. For example, the absence of the refresh signal will generate an alert since the lack of refresh may cause the file server 12 to fail. Similarly, an indication of a memory parity error will cause the generation of an alert. Also innately monitored by the bus monitor 44 are the printer port, so that the system manager 22 can report whether or not there is a printer error or is out of paper, the asynchronous serial port, so that the system manager can monitor and log asynchronous activity such as overrun errors, parity errors, and framing errors for system board serial ports, system software, so that software errors can be identified, and keyboard events, so that keystrokes can be logged and the relationship between a system failure and keyboard inputs can be analyzed Finally, the bus monitor 44 will detect the assertion of IOCHK, indicative of a catastrophic board failure, and board "times out", indicative of a violation of EISA standards. The bus monitor 44 transfers these signals to information processing and alert determination elements 52 where the monitored information is processed. As will be more fully described below, the information processing and alert determination elements 52 of the system manager 22 is comprised of a control processor and supporting logic which, by the application of object management techniques, is configured to determine whether the monitored information warrants the generation of an alert.

The system manager 22 further provides for the monitoring of other signals for delivery to the information processing and alert determination elements 52 for potential generation of alerts. These other signals are supplied to the information processing and alert determination elements 52 by a path distinct from that previously discussed. To power the system manager 22, the computer system bus 13 provides ±5 Volt and ±12 Volt lines to a power-temperature monitor/power supply elements 50. The level of voltage supplied to the system manager 22 is converted into a digital signal by an analog-to-digital converter included in the power-temperature monitor/power supply elements 50 and the digital power level signal is provided to the information processing and alert determination elements 52. For example, if a drop in system power is detected, the information processing and alert determination elements 52 will generate an alert. If, however, a complete loss of power occurs, the system manager 22 will switch to battery power and the event reported, again as an alert, through one or both of its asynchronous modem and serial connections. This aspect of the system manager 22 is more fully described in co-pending patent application Ser. No. 07/719,394, entitled "Power Supply for a Computer System Manager" and previously incorporated by reference. Briefly, however, after loss of system power, the system manager will switch into reserve power to deliver alerts and, after completing alert delivery, to standby mode to conserve power. After reserve power is exhausted, the system manager then switches into dormant mode to keep its RAM memory valid for an extended period of time and, after the expiration of the extended period of time, cutting power off completely.

The system manager 22 is further provided with a temperature sensor 48. The internal temperature of the system manager 22 is continuously monitored by the temperature sensor 48 and the measured temperature transmitted to power-temperature monitor/power supply elements 50 where analog to digital conversion of the monitored temperature is performed. The digital temperature level is then transmitted to information processing and alert determination elements 52 for object management. If the information processing and alert determination elements 52 determine that the temperature has risen above a predetermined threshold, then an alert may be issued.

Finally, a bus master interface 46 is used to transfer certain signals from the network operating system 14 to the information processing and alert determination elements 52. Typically, the information provided by the bus master interface 46 differs from that passively supplied by the bus monitor 44 or the power-temperature monitor/power supply elements 50 in that information supplied via the bus master interface 46 are supplied as hard inputs. However, by interfacing with network operating system 14, the system manager 22 can monitor network resources other than the computer system board 13 itself. For example, in a typical network management system, the intelligent disk array controller device 26 would provide management information to the network management agent 15 such as the number of read errors that have occurred. In turn, the network management agent 15 can provide that information to the system manager 22 via the bus master interface 46.

The information passively monitored by the bus monitor 44 and the power-temperature monitor portion of the power-temperature monitor/power supply elements 50 and supplied to the information processing and alert determination elements 52, as well as that information supplied to the information processing and alert determination elements 52 by the bus master interface 46 may be used for several purposes. First, the information processing and alert determination elements 52 can process the information and, if appropriate, generate an alert. Examples of alert conditions that may be determined by information processing and alert determination elements 52 include loss of system power, server subsystem failure, excessive server temperature as well as other configurable events that require outside attention.

Once the information processing and alert determination elements 52 determine that an alert should be issued, such an alert can be issued in a number of ways. Initially, it must be determined if the alert should be delivered "in-band" or "out-of-band". Once originated by the information processing and alert determination elements 52, an in-band alert is directed to the bus master interface 46 and on to the network operating system 14 and, under the control of the network management software contained in the network management agent 15, on to the local network manager console 36. So that the use of existing network hardware is maximized, it is contemplated that in-band alerts to the local network manager console 36 will be utilized as the primary path for communications with the system manager 22. It should be specifically noted, however, that, a local system manager console may be used to receive in-band alerts without departing from the practice of the present invention. If the information processing and alert determination elements 52 determine that the alert should be issued "out-of-band", the alert is transmitted to communication elements 54 where an alert is issued. As is more fully described in co-pending U.S. patent application Ser. No. 07/720,258, entitled "In-band/Out-of-band Alert Delivery system for a Computer System Manager" and previously incorporated by reference, the communication elements may send an out-of-band alert by sending a protocol message over a switched telephone connection to the system manager facility 34, by dialing a phone number associated with a pager 56 or by dialing a phone number to a phone 58 associated with a person and generating a synthesized voice message upon completing a connection with the phone 58.

In addition to alert determination and generation based upon the passively monitored information, the information processing and alert determination elements 52 also perform several other functions. More specifically, the received information is also time stamped and stored or "logged" into RAM memory for later access. Thus, in the event of a catastrophic failure of the file server 12, the monitored and logged information will be available for "post mortem" diagnostics. Similarly, network information may be transferred over the bus master interface 46 and logged into RAM memory contained within the information processing and alert determination elements 52. Finally, the objects can be transferred, for example to the remote system manager facility 34 or the local network manager console 36 to provide real-time information regarding the performance of the system manager 22.

Through the link between the communications elements 54 of the system manager 22 and the system manager facility 34, significant control of the system manager 22 can be performed from a remote location. From the system manager facility 34, remote console emulation, access to stored data and remote control or "rebooting" may be performed. Remote console emulation or "hard key insertion" permits keystrokes at the remote console to be delivered to the system manager 22 as if they were input locally. Through the hard key insertion, "soft" reboots are emulated by simultaneously inserting "control"—"alt"—"del" to actuate a reboot of the system manager 22. While not being able to actuate a complete "hard" reboot, the system manager facility 34 can simulate a hard reboot by selectively removing power from system components. More information regarding remote console emulation is set forth in co-pending U.S. patent application Ser. No. 07/719,243, entitled "Remote Console Emulator for a Computer System Manager" and previously incorporated by reference.

Figure 3:
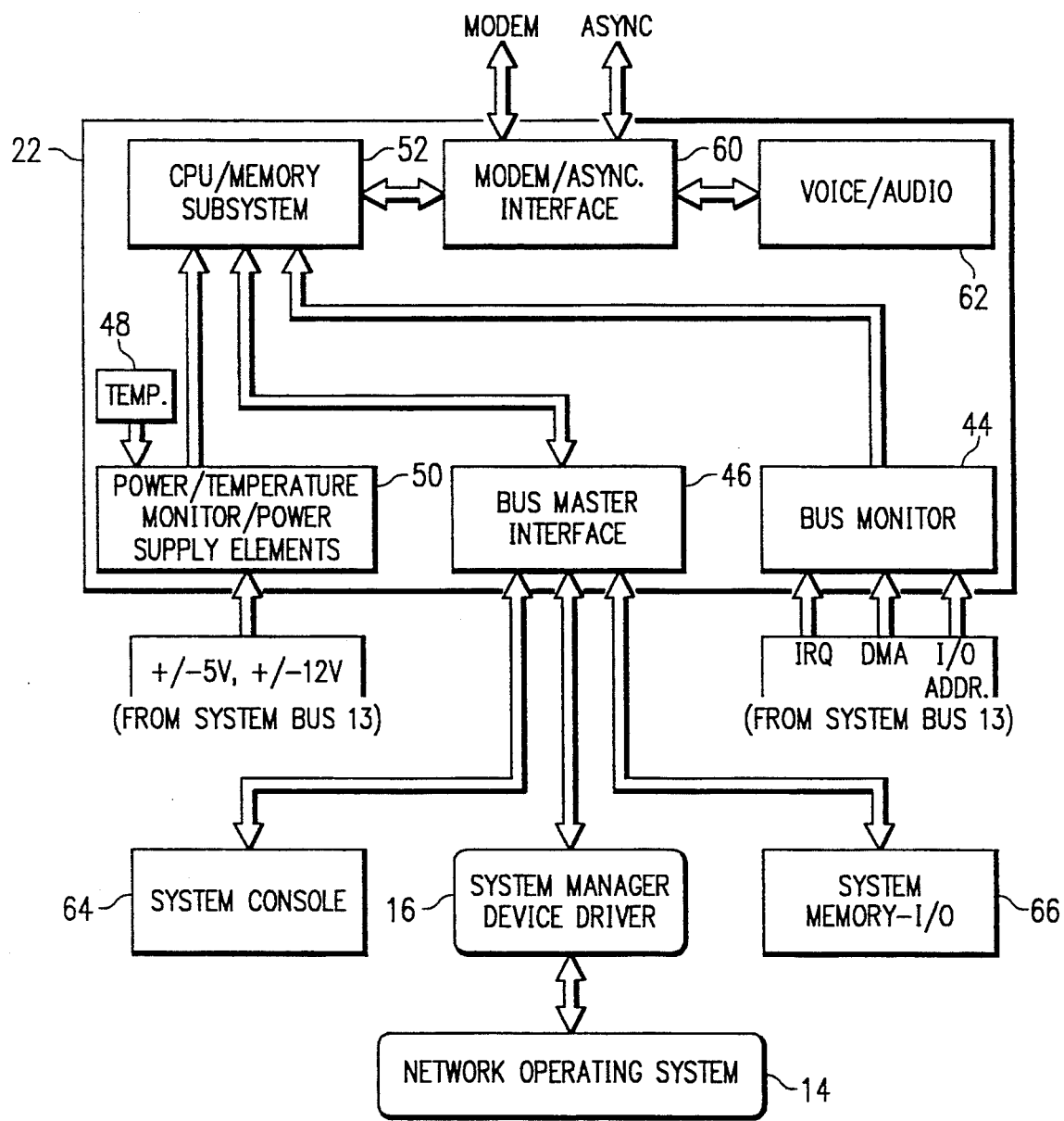
FIG. 3 is a top level block diagram of the system manager of FIGS. 1–2.

Referring next to FIG. 3, the structural configuration of the system manager 22 shall now be described in greater detail. While quite similar to FIG. 2, certain elements of the system manager 22 have now been redesignated to more closely describe their structural configurations whereas, in FIG. 2, such elements were designated with their operational characteristics closer in mind. As may be better seen in FIG. 3, the bus monitor 44 innately monitors a plurality of signals relating to the state of the computer system board 13. Innate monitoring is accomplished by the bus monitor 44 receiving all data and address signals being transferred along the system bus 13. The bus monitor 44 will then select those signals which will help determine the state of the computer system board 13 and directs the selected signals via a bus to, what previously was functionally designated as the information processing and alert determination elements 52 and what is now structurally designated as a CPU/memory subsystem 52 which is the hardware which, together with associated firmware, will perform the aforementioned information processing and alert determination functions. Other signals, indicated here as miscellaneous system signals, are always considered to help determine the state of the computer system board and are directed through the bus monitor 44 to the CPU/memory subsystem 52. Additionally, the system bus 13 supplies power to the system manager 22 via $\pm 5$ V, $\pm 12$ V lines to the power-temperature monitor/power supply element 50 and on to the CPU/memory subsystem 52. In the event of that the supply of power from the system bus 13 is terminated, the power-temperature monitor/power supply element 50 will begin supplying power from a battery included therein. The termination of the supply of power from the system bus will also be reported to the CPU/memory subsystem 52 as an alert condition.

Connected to output of the CPU/memory subsystem is a modem/asynchronous interface 60 represents the two paths along which an out-of-band alert may be transmitted, via an asynchronous communication port or via a modem, in the event that an alert condition has been established. Alert conditions include loss of system power, server subsystem failure, excessive server temperature as well as out of other events which require the attention of the system manager facility 34. Either of these may be used to report an alert condition, although the modem would typically contact either one of the pager 56 or the phone 58 while the asynchronous communication port would typically contact a remote system manager, for example the system manager facility 34 illustrated in FIG. 2. Servicing the modem/asynchronous interface 60 is voice/audio elements 62. In the event that a voice alert is selected, the voice audio elements generate the voice alert which is then transferred to a phone 58 via the modem. Finally, in the system manager configuration illustrated herein, a local system manager console 64 and system memory I/O support the system manager 22 and are accessible via the bus master interface 46.

Figure 4:
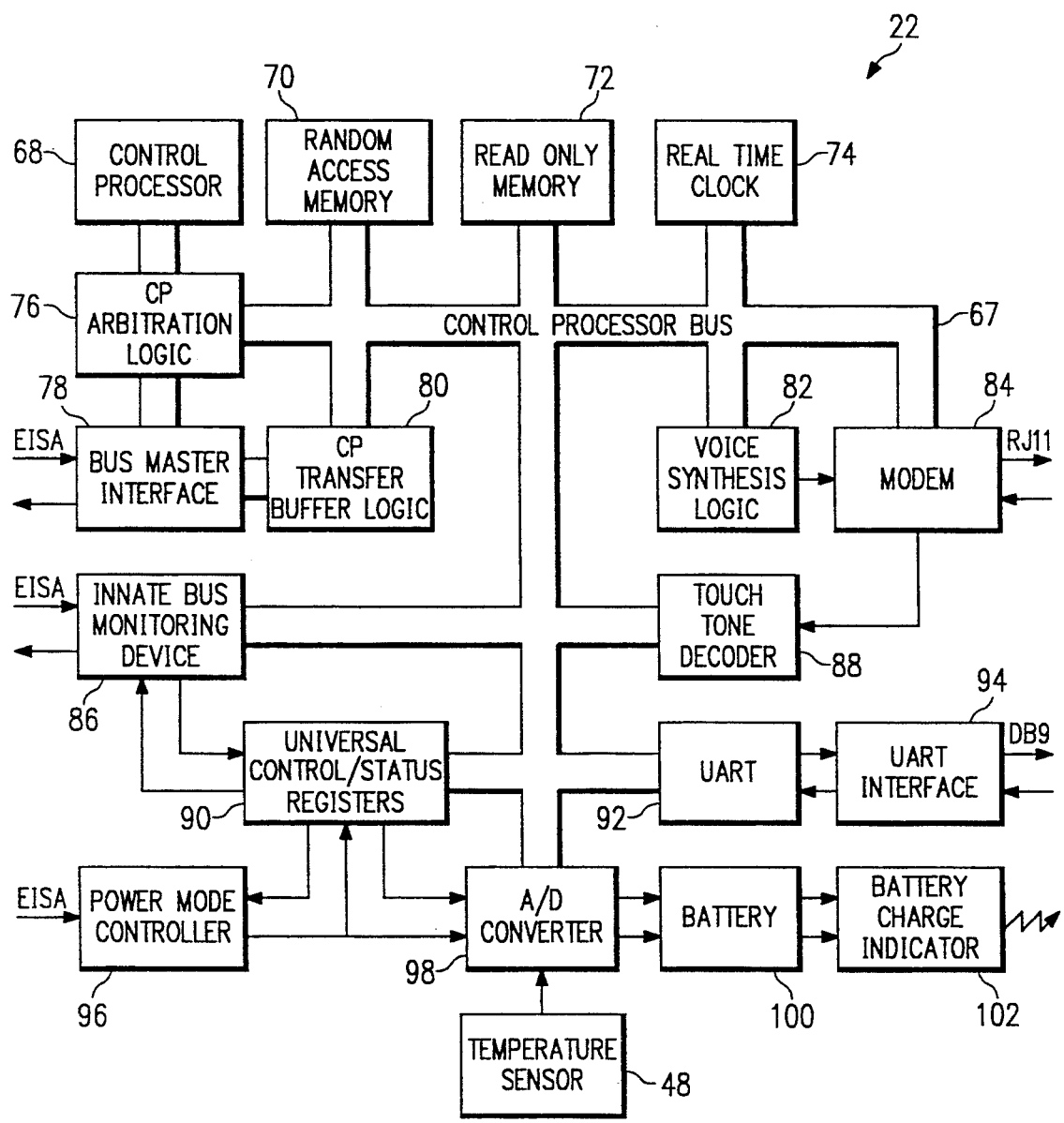
FIG. 4 is a low level block diagram of the system manager of FIG. 3.

Referring next to FIG. 4 the system manager 22 shall now be described in still greater detail. The system manager 22 is comprised of a bi-directional control processor bus 67 and a series of system manager components connected to the control processor bus 67 for the transfer of address, data and control signals between various components of the system manager 22. Connected to the control process or bus 67 are a control processor 68, random access memory 70, read only memory 72, a real time clock 74, control processor arbitration logic 76, a bus master interface 78, control processor transfer buffer logic 80, voice synthesis logic 82, a modem 84, a innate bus monitoring device 86, a touch tone decoder 88, universal control/status registers 90, a universal asynchronous receiver transmitter (or "UART") 92, a UART interface 94, a power mode controller 96, an analog-to-digital converter 98; and indirectly a battery 100 and a battery charge indicator 102 and a temperature sensor 48.

The various operations performed by the system manager 22 and the various system manager components 48 and 68–102 which are utilized to perform such operations shall now be described in greater detail. In the embodiment of the invention disclosed herein, the control processor 68 is a 16 bit microprocessor which operates at 16 MHz, although, in alternate embodiments of the invention, other microprocessor types will be suitable for use. The control processor 68 performs multiple tasks, including a primary task of collecting and storing information received from multiple sources and detecting failures based upon acquired data and issue alerts as appropriate. The control processor 68 also performs several other tasks which will be described in greater detail later. In its primary task, object data which is processed by the control processor 68 is stored in the random access memory 70 and processor instructions are stored in the read only memory 72. Depending on the particular object management performed on a particular system component, data from the computer system bus 13 and innately monitored by the innate bus monitoring device 86 may be operated on by the control processor 68 and the resultant object stored in the random access memory 70 or, depending on the particular object being managed, may be directly stored into the random access memory 70. Similarly, temperature and/or power data transmitted by the A/D converter 98 may be operated on by the control processor 68 and the result stored in the random access memory 70 or may be directly stored into the random access memory 70. The real time clock is a clock independent of the system clock which is configured to store date, time, year and other time related variables relating to objects, depending on user preference.

In "normal" operation, the control processor 68 controls the control processor bus 67 to provide data transfers between the control processor 68, the random access memory 70, the read only memory 72 and the real time clock 74. In normal operation, the control processor 68 performs object management as set forth in detail elsewhere. Based upon the acquired data, object management will provide for the detection of failures of the file server 12 or subsystem thereof.

The bus master interface 78 which, for example, may be an Intel 82355 BMIC, is configured to interrogate and modify the memory and I/O space 66 of the computer system 13 as well as the random access memory 70 of the system manager 22. For example, during a "data transfer operation" involving the system manager 22, the control processor arbitration logic 76 instructs the control processor bus 67 regarding the address, direction and destination of the data transfer. The control process or arbitration logic 76 then instructs the bus master interface 78 as to the transfer. Once the system manager 22 is ready for a transfer, the bus master interface 78 will then instruct the computer system bus 13 to arrange for a burst transfer of data to the bus master interface 78 which, in turn, will transfer the data, to the control processor transfer buffer logic 80 and on to the random access memory 70 for storage. Transfer of data from the random access memory 70 to the bus master interface 78 is accomplished in reverse manner.

Once, object management within the control processor 68 has indicated that an alert should be generated, the control processor 68 controls the delivery of the appropriate alert message via the modem 84, the UART 94 and/or the network operating system 15. The UART 94 provides an asynchronous interface between the system manager 22 and the system manager facility 34. Through a software interface provided between the UART 94 and the system manager facility 34, for example, by use of the Windows software, the system manager facility 34 is capable of reading monitored object values from and writing object control to the system manager 22. Likewise, video screen data can be transmitted from the system manager 22 to the remote console and keystrokes can be transmitted from the system manager facility 34 to the system manager 22. The system manager facility 34 also keeps alert logs. Finally, another function of the UART 94 is to connect an external modem to deliver page alerts under the control of the control processor 68.

As previously mentioned, alerts delivered to the pager 54 or the phone 56 are made via the modem 84 under the control of the control processor 68. When, however, an alert message is delivered to the phone 56, the voice synthesis logic 82 is utilized by the control processor 68 in order to generate an audible, voice alert. Pre-recorded voice messages are stored within the voice synthesis logic 82. These voice messages, which are stored in accordance with adaptive differential pulse code modulation, relate to a multitude of messages which may be accessed by the control processor and transmitted. For example, dates, numbers, alert conditions, names, voltages which correspond to the information useful to identify the type, severity, time of, location, or other identifying information regarding alert conditions. Thus, if the control processor desired to transmit a voice alert, the control processor 68 would instruct the voice synthesis logic 82 to supply the selected message to the modem 84, which, for example may be a 2400 bit per second modem, can transmit the selected message over its two way interface with the phone 58. After the alert has been transmitted, the modem 84 will await a return call through which it will pass server information and control.

The touch tone decoder 88 is connected to accept analog signals from the modem 84. The touch tone decoder 88 decodes signals received by the modem and informs the control processor as to the nature of the signal. Most commonly, the touch tone decoder will be used to provide security for the system manager 22. For example, when a alert delivery is sent via the modem 84 to a pager 56 or a phone, a user receiving the alert will, in many situations, desire to contact the system manager 22 for additional information. For example, if the user transmits a password to the modem 84, the touch tone decoder 88 will decode the tones and transmit the decoded tones to the control processor 68. The control processor 68 then decides whether the password is legitimate. As will be more fully described in co-pending application Ser. No. 07/719,243, entitled "Remote Console Emulator for System Bus Manager", and previously incorporated by reference, the touch tone decoder 88 is also utilized in connection with remote console emulation operations.

The power mode controller 92 both controls the power for the system manager 22 and monitors the power level for the system board. In a manner more fully described in co-pending application Ser. No. 07/719,394, entitled "Power Supply Controller for Computer System Manager", and previously incorporated by reference, the power mode controller will control the operation of the system manager 22 by designating which of alternate power modes the system manager 22, or in accordance with the requirements of certain power modes, which components of the system manager 22 are to be supplied power. In the event that power from the system bus 13 is unavailable, the battery 100 shall supply power to either the system manager 22 or to selected components thereof. As the battery 100 is rechargeable, the battery charge indicator 102 is provided to indicate when the battery 100 is being recharged. For example, the power mode controller 92 will cause the system manager 22 to activate the battery 100 should the supply voltage needed to operate the system manager 22 fall below a minimum operating voltage. The power mode controller 92 will also turn on and off devices not needed during operation of the battery 100. This circuitry will provide the best use of the battery 100 in this low power mode. After the processor delivers an alert, the power mode controller 92 will turn off the power to the control processor 68. The processor will be restarted when a call is detected, UART activity, expiration of set interval in real time clock and other system activity or subsystem activity.

Figure 5:
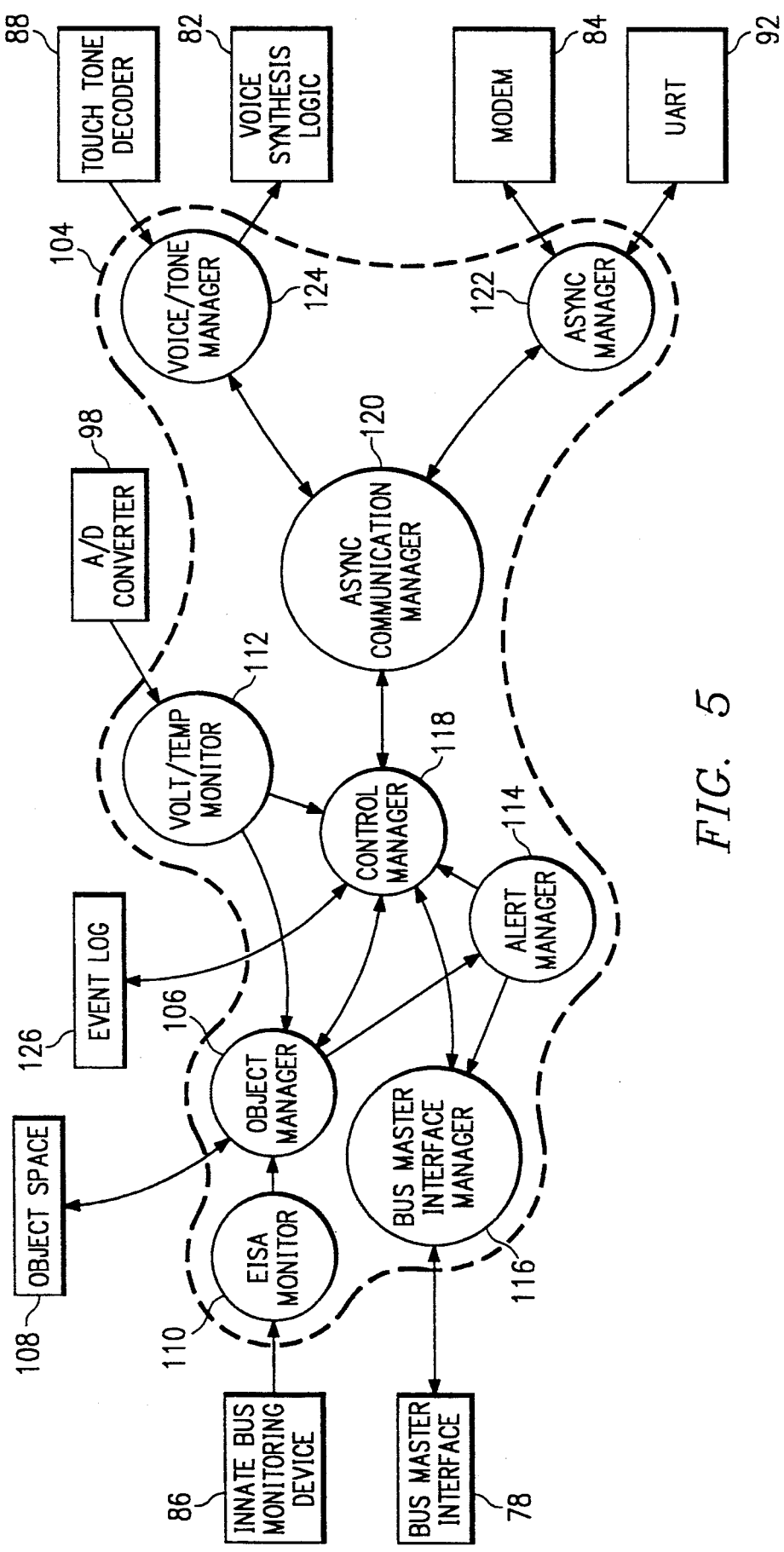
FIG. 5 is a flow diagram of the dataflow between the hardware and software components of the system manager of FIGS. 1–3.

Referring next to FIG. 5, the flow of data between the various hardware and firmware components of the system manager 22 shall now be described in greater detail. System manager occurs within the control processor 68 by the interaction of the control processor firmware 104 with the control processor's random access memory 70 as well as certain other hardware elements. In a manner to be more fully described below, the system manager firmware 104 acts upon inputs from the bus master interface 78 and the UART 94, monitors parameters of the system board 13 being input by the innate bus monitoring device 86, monitors temperature and power parameters of the system board 13 being input by the A/D converter 98, and, as deemed necessary, generate alerts via the bus master interface 78 and/or the UART 94.

The system manager 22 operates based upon the concept of object management. Each object represents a system component that can be managed and contains pertinent information about the component that it represents. As changes occur that affect the status of a component, the information contained in the corresponding object is updated. Objects and/or data related to objects are input to the system manager firmware 104, processed therein, and stored in an object space 108 located within the random access memory 70. The object space 108 is managed by an object manager 106 which receives object messages from the bus master interface 78, the UART 94, and, in the case of innate objects updates, from within the system manager firmware 104 itself.

More specifically, an EISA monitor 110, in conjunction with programmable hardware within the innate bus monitoring device 86, selectively listens to bus activity. As events are detected, the EISA monitor 110 provides information relating to the object manager for updating the innate objects corresponding to the event. Similarly, the voltage/temperature monitor 112 periodically monitors the ±5, ±12 voltages supplied to the system bus manager 22 by the system bus 13 and updates the innate objects corresponding to power and temperature. In the event of a loss of power from the system bus 13, however, the voltage/temperature monitor 112 will report a power event directly to a control manager 118.

For each update, increment or decrement, the object manager 106 will, in the event that a boundary or threshold has been exceeded, determine that an alert needs to be issued. The object manager 106 will then request that an alert manager 114 compose an appropriate alert message and transmit the composed message. If the composed alert message is to be an in-band alert, the alert message is sent to a bus master interface manager 116 and, if the composed alert message is to be an out-of-band alert, the alert message is sent to the control manager 118. The control manager 118 would then forward the out-of-band alert to an asynchronous communication manager 120. The asynchronous communication manager 120 acts a traffic controller between the various tasks to be performed by the system manager firmware 104 and an asynchronous manager 122 which provides the firmware interface between the system firmware 104 and both the modem 84 and the UART 94. For example, if a voice message is to be generated for the out-of-band alert, the asynchronous communication manager 120 would interface with a voice/tone manager 124 which, like the asynchronous manager 122, provides the firmware interface between the system firmware and the voice synthesis logic 82 and the touch tone decoder 88. Thus, during the out-of-band alert delivery, the asynchronous communication manager 120 would transfer the alert message, as well as any voice message to accompany and/or comprise the alert, to the asynchronous manager 122 which would then deliver the alert message, either via the modem 84 or the UART 94.

Finally, in addition to delivering out-of-band alert messages originating with the alert manager 114 to the asynchronous communication manager 120, the control manager 118 performs several other functions. First, in the event of critical event occurrences, such as loss of power or failure to communicate with the system 13, the control manager will directly generate out-of-band alert messages. Second, the control manager serves to monitor significant events monitored by other managers, log events in an event log 126 which, like the object space 108, is located within the random access memory 70, and provide logged information as requested. Logged information can be requested by the bus master interface manager for transfer, via the bus master interface to the network operating system 14 and by the asynchronous communication manager 120 for transfer via the asynchronous manager 122 to the UART 94.

Figure 6:
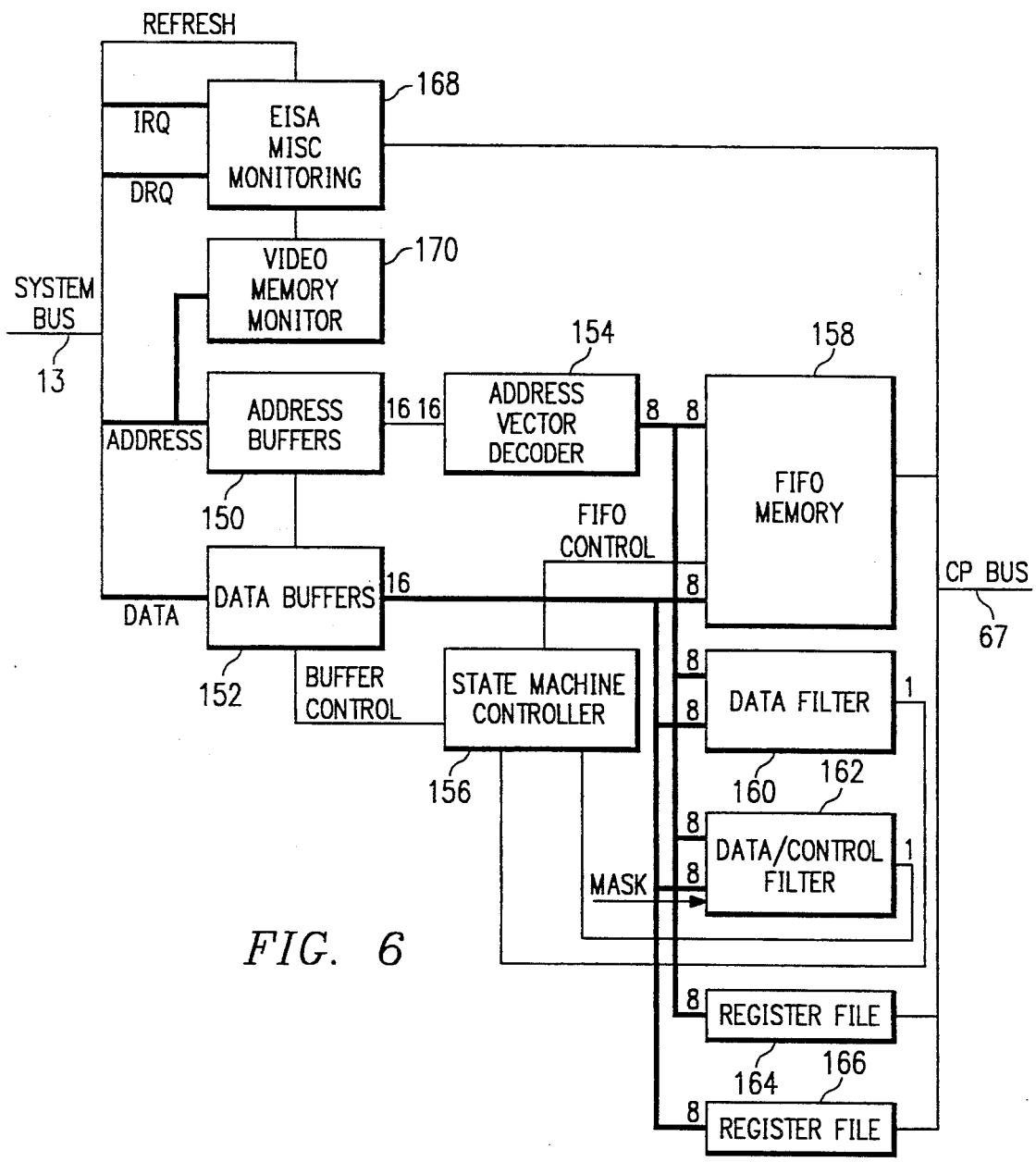
FIG. 6 is a schematic diagram of the innate bus monitoring device subject of the present invention.

Referring next to FIG. 6, the innate bus monitoring device 86 subject of the present invention shall now be described in greater detail. At the start of a system bus cycle, the innate bus monitor's state machine controller 156 begins the process of reading in data on the system bus 13. Thus, in addition to being transferred to their original destinations to perform their designated functions, all address and data signals being transferred along the system bus 13 are input to a series of address buffers 150 and a series of data buffers 152, respectfully. By pipelining the address and data signals input to the innate bus monitoring device 86 through a series of address and data buffers 150, 152, respectfully, for example by successively enabling successive ones of the series of address and data buffers 150, 152, the processing of address signals and data signals being delivered from the system bus 13 to the innate bus monitoring device 86 are delayed a short time period. Preferably, the pipelining delay is sufficiently long so that the prior signals delivered to the innate bus monitoring device 86 may be processed. During high speed operations, signals would be delivered at a very high rate, most typically as a data burst with a transfer rate of up to 33 Mbytes/second. In view of the high rate of data transfer occurring on the system bus 13, pipelining the input address and data signals to delay output from the address and data buffers 150, 152, respectfully, for a full bus cycle shall be sufficient to ensure that all address and data signals are processed and not inadvertently overwritten by later address and data signals. It is contemplated, however, that if the transfer of address and data signals is sufficiently slow, the address and data buffers 150, 152 could be omitted without departing significantly from the concept of the present invention.

When a system bus cycle ends, a state machine controller 156 determines if that cycle represents an event of interest to that control processor 68. Thus from the last of the series of address buffers 150, the address signals are then decoded in an address vector decoder unit 154 which, for example, may be a 64K × 8 programmable read only memory (or "PROM") and which effectively acts as a pre-filter for the innate bus monitoring device 86. The address signals are input to the address vector decoder unit 154 as 16 bit input addresses. The address vector decoder unit 154 has a series of 8 bit vectors stored therein that correspond to events which, if they occur on the system bus 13, would be considered to be of interest. Typically, the addresses of interest are pre-programmed into the address vector decoder unit 154 before installation into the innate bus monitoring system 86. If an address transferred to the address vector decoder 154 from the address buffers 150 corresponds to an address pre-programmed into the address vector decoder unit 154 as being an address of interest, the input address would select the corresponding 8 bit address vector pre-programed into the address vector decoder 154 to be output therefrom. Furthermore, as the address vector decoder 154 is installed in a socket on the innate monitoring device 86, the selected addresses of interest can be easily modified, for example, if it was later determined that an event having an address not previously pre-selected was of interest or if the system bus 13 being monitored by the innate monitoring device 86 was increased in size. The innate monitoring device 86 is, therefore, readily scalable to handle a larger amount of data.

Upon completing the pre-filtering of the address vectors by the address vector decoder 154, the state machine controller 156 enables the last one of the series of data buffers 152, thereby enabling the address vectors pre-filtered to be limited to those address vectors corresponding to addresses of system bus data transfers that: (1) actually occurred and (2) is of interest, i.e. was a pre-selected PROM address and the data stored in the last of the data buffers 152 are input the data filter 160 and data/control filter 162, both of which, for example, may be comprised of a 64K × 1 static random access memory (or "SRAM"). It should be noted, however, that selected data signals output from the last one of the series of data buffers 152 are input into each of the data filter 160 and the data/control filter 162 while all of the vectors output from the address vector decoder 154 are input to each of the data filter 160 and the data/control filter 162.

Within the data filter 160 and the data/control filter 162, address vectors and data signals which correspond to predetermined patterns are matched with each other. The matching process within the data filter 160 and the data/control filter 162 are, however, slightly different from each other. The data filter 160 directly matches the address vectors input from the address vector decoder 154 with data input from the data buffers 152 and, when a match is completed a signal is sent to the state machine controller 156 which, in turn, enables a first-in, first-out (or "FIFO") memory to read in the address and data signals directly from the address vector decoder 154 and the data buffers 152. Pattern matching within the data/control filter 162 would differ somewhat. Of the address vectors selected by the address vector decoder, those address vectors for which every data bit corresponding to the address vector is of interest are sent to the data filter 160. The address vectors and system data are sent to the data filter, while the data/control filter receives address vectors, data, I/O, and masking control bits. To further increase the flexibility of the innate monitoring device 86 to match address and data bits corresponding to events of interest, a mask input is provided to the data/control filter 162 to provide for dynamic modification of the combination of the supplied data signals which would be patterned by the data/control filter as corresponding to a selected address vector of interest.

Data corresponding to each address vector output by the address vector decoder 154 are selected and written, together with the corresponding address vector to either the FIFO memory 158 or to register files 164, 166. The determination of whether to write the selected address and data signals to the FIFO memory or to the register files 164, 166 depend on the characteristics of the event of interest which corresponds to the selected address and data signals. The selection between the FIFO and the register file is made depending on the type of event being addressed. If the data relating to the event of interest is dynamic, i.e. the event changes quite often, and only the status of the event at the time of the read is important, would be directed to the register files 162, 164 where the fact that each read writes over the prior read is of little consequence. Otherwise, the address vectors and selected data output the data filters 160, 162 will be directed to the FIFO memory 158. When address and data information relating to an event of interest is stored in the FIFO memory 158, an interrupt signal will be transmitted to the system manager 22. The system manager 22 can, in turn, either read the information at that time or read the information stored at a later time.

The FIFO memory 158 may be chosen to be of any size, depending on certain characteristics of the system being monitored. For example, in the embodiment of the invention disclosed herein, a FIFO memory sized to store 512×16 bits of memory is contemplated A FIFO memory of this size would enable data relating to approximately 500 events of interest to be stored in the FIFO memory 158 before events would be missed. This would reduce the need for the control processor 68 to repeatedly remove information stored in the FIFO memory 158.

Certain other signals relating to events of interest are relayed directly from the system bus 13 to the control processor. These signals relate to events which are always considered to be of interest to the system manager 22 and for which the control processor should be immediately interrupted upon occurrence. IRQ and DRQ signals, both of which have been previously described at length, are delivered immediately from the system bus 13 to an miscellaneous EISA signal monitor 168. In addition, signals related to the updating of the video screen of the remote console 34 are delivered to a video memory monitor 170 which, in turn, issues a signal to the miscellaneous EISA signal monitor whenever the video screen is updated. The miscellaneous EISA monitor 168 would then issue an interrupt request to the control processor 67 for delivery of the event to the control processor 68.

Figure 7:
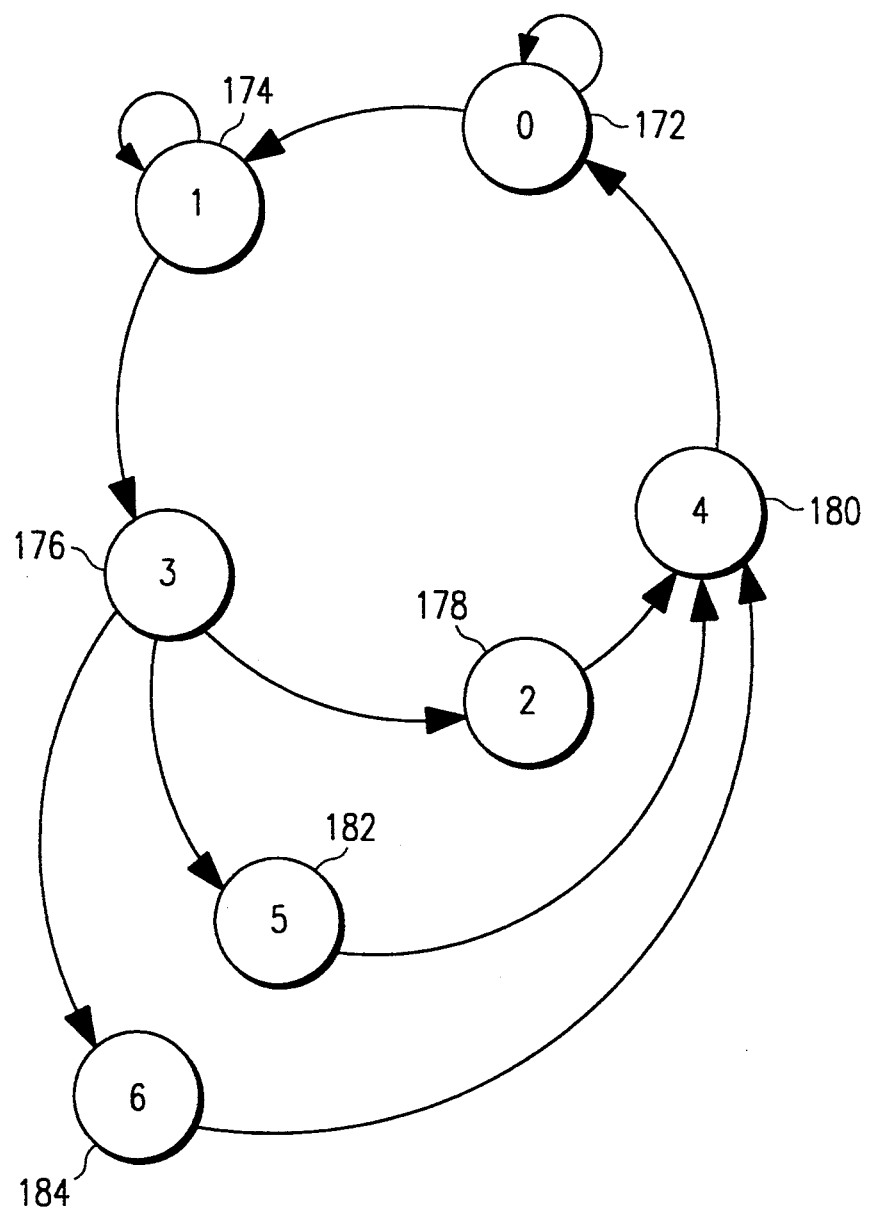
FIG. 7 is a state diagram of the state machine controller of FIG. 6.

Referring next to FIG. 7, the operation of the state machine 156 shall now be described in greater detail. An idle or "0" state for the state machine controller 156 occurs at bubble 172. When the innate monitoring device 86 is enabled by enabling the address and data buffers 150, 152 and the system bus cycle starts, the state machine controller 156 enters state 1 at bubble 174. The state machine controller 156 will stay in state 1 until the system bus cycle ends, where the state machine 156 will enter state 3 at bubble 176. State 3 is a decision state in that the state machine controller 156 will decide whether to read address and data signals into the FIFO memory 158, an index register file 164 or a data register file 166 and selection shall be made based upon the contents of certain bits of the address data vector to be read which provide information regarding how dynamic the selected data is. If, based upon certain of the vector bits, the data is considered to be sufficiently dynamic to require storage in the register files 164, 166, the state machine controller 156 will enter state 5 at bubble 182, proceed to state 4 at bubble 180 to conduct a write to the index register file 164, followed by a second loop through states 0 at bubble 172, 1 at bubble 174, 3 at bubble 176, 6 at bubble 184 and 4 at bubble 180 to complete a write to the data register file 166.

Returning to the decision state 3 at bubble 176, if it is determined that, based upon certain of the vector bits, the data is not sufficiently dynamic to require storage in the register file, the state machine controller 156 will proceed to state 2 at bubble 178 where a FIFO write is selected and on to state 4 at bubble 180 where the FIFO write is performed.

Thus, there has been described and illustrated herein, an innate bus monitoring device which passively monitors signals being transferred on the system bus for a computer system and selects certain ones of those signals as being related to the condition of the system and delivering the selected signals to a computer processor for object management. By passively monitoring all signals and then delivering only those signals of interest, a significant reduction in processing time is achieved. Furthermore, the number of interrupts to the computer processor which must be generated during the monitoring process is reduced. However, those skilled in the art will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation on the scope of the invention.

What is claimed is:

1. For a computer network having a computer system having a plurality of components interconnected by a system bus for transferring information between said components, a system for innately monitoring said computer system, comprising:

means for receiving all address and data signals transferred over said system bus;

means for selecting address signals related to operating conditions of said computer system by selecting said address signals which match preselected address signals;

means for classifying said selected data signals related to operating conditions of said computer system as either in a first class or a second class based upon said selected address signals;

a data filter for selecting data signals which correspond to said selected address signals;

first storage means for storing said selected address and data signals related to operating conditions of said computer system and classified in said first class;

second storage means for storing said selected address and data signals related to operating conditions of said computer system and classified in said second class; and means for selectively directing said signals to said first storage means or said second storage means based upon said classification of said data signals as either in said first class or said second class.

2. An innate monitoring system according to claim 1 wherein said first storage means further comprises:

a register file for storing said address and data signals classified in said first class; and said second storage means further comprises:

a first-in, first-out memory for storing said address and data signals classified in said second class.

3. An innate monitoring system according to claim 2 and further comprising:

an address buffer for receiving all of said address signals transferred over said system bus; and a data buffer for receiving all of said data signals transferred over said system bus.

4. An innate monitoring system according to claim 3 wherein said means for selecting address signals related to operating conditions of said computer system further comprises an address pre-filter having a series of address vectors stored therein, said address prefilter comparing said address signals transferred over said system bus to said address vectors and propagating said address vectors which match said address signals to said data filter, said data filter receiving said received data signals from said data buffer and identifying said received data signals which correspond to said propagated address vectors.

5. An innate monitoring system according to claim 4 and further comprising a state machine connected to said data filter, said state machine receiving selected bits of said received data signals relating to operating conditions and having control outputs connected to said register file and said first-in, first-out memory, respectively, said state machine controlling the selective propagation of said received data signals related to operating conditions to either said register file or said first-in, first-out memory based upon the contents of said selected bits of said received data signals.

6. An innate monitoring system for a computer system having a plurality of components interconnected by a system bus which transfers information between said components, comprising:

an address buffer connected to said system bus, said address buffer receiving all address signals transferred along said system bus;

a data buffer connected to said system bus, said data buffer receiving all data signals transferred along said system bus;

an address pre-filter connected to said address buffer and having pre-selected address signals stored therein, said address pre-filter receiving said address signals stored in said address buffer and comparing said address signals received from said address buffer to said pre-selected address signals, said received address signals which match said pre-selected address signals being classified as related to events of interest which have occurred within said computer system;

a data filter connected to said data buffer and said address pre-filter, said data filter receiving data signals stored in said data buffer and said address signals matched by said address pre-filter, said data filter selecting data signals which correspond to said matched address signals, said data signals corresponding to said matched address signals being classified as related to events of interest which have occurred within said computer system;

a state machine connected to said data filter, said state machine receiving selected bits of said received data signals classified as related to events of interest which have occurred within said computer system, said state machine further classifying said selected address and data signals as either in a first class or a second class based upon the contents of said selected bits of said data signals;

a register file connected to said data filter, said register file storing said received address and data signals classified by said state machine in said first class; and a first-in, first-out memory connected to said data filter, said first-in, first-out memory storing said received address and data signals classified by said state machine in said second class;

said state machine further comprising first and second control outputs connected to said register file and said first-in, first-out memory, respectively, said control outputs controlling the selective propagation of said address and data signals classified in said first and second classes to said register file and said first-in, first-out memory, respectively.

7. A computer network, comprising:
a file server having a computer system board with a system bus installed therein;
at least one computer station;
a network connecting said at least one computer station to said file server;
a network operating system for controlling information transfers between said file server and said at least one computer station via said network, said network operating system including a network manager for managing information transfers along said network; and a system manager for managing said computer system board, said system manager managing said computer system board by monitoring signals transferred along said system bus of said computer system board, said system manager including an innate bus monitoring system and a computer processor;

said innate bus monitoring system comprising means for receiving all data and address signals transferred along said system bus, means for selecting address signals related to operating conditions of said computer system by selecting said address signals which match preselected address signals, means for classifying said selected data signals related to operating conditions of said computer system as either in a first class or a second class based upon the contents of said data signals, a data filter for selecting data signals which correspond to said selected address signals, first storage means for storing said selected address and data signals related to operating conditions of said computer system and classified in said first class, second storage means for storing said selected address and data signals related to operating conditions of said computer system and classified in said second class and means for selectively directing said signals to said first storage means or said second storage means based upon said classification of said data signals as either in said first class or said second class.

8. A computer system, comprising:
a file server having a system board with a system bus installed therein;
a system manager for managing said system board, said system manager managing said computer system board by monitoring signals transferred along said system bus of said system board;
said system manager including a computer processor and an innate bus monitoring system, said innate bus monitoring system comprising means for receiving all data and address signals transferred along said system bus, means for selecting address signals related to operating conditions of said computer system by selecting said address signals which match preselected address signals, means for classifying said selected data signals related to operating conditions of said computer system as either in a first class or a second class based upon the contents of said data signals, a data filter for selecting data signals which correspond to said selected address signals, first storage means for storing said selected address and data signals related to operating conditions of said computer system and classified in said first class, second storage means for storing said selected address and data signals related to operating conditions of said computer system and classified in said second class and means for selectively directing said signals to said first storage means or said second storage means based upon said classification of said data signals as either in said first class or said second class.

9. An innate monitoring system according to claim 2 wherein said means for classifying said selected data signals related to operating conditions of said computer system as either in said first or second classes further comprises means for classifying said selected data signals related to operating conditions of said computer system as either in said first or second classes based upon the contents of selected bits of said selected address signals.

* * * * *